(12) United States Patent
Wolff

(10) Patent No.: US 7,789,435 B2
(45) Date of Patent: Sep. 7, 2010

(54) BEVELED INSERT FOR FACILITATING COUPLING PIPES

(76) Inventor: Steven K. Wolff, 532 E. 7th Pl., Mesa, AZ (US) 85203

( * ) Notice: Subject to any disclaimer, the term of this patent is extended or adjusted under 35 U.S.C. 154(b) by 0 days.

(21) Appl. No.: 12/112,974

(22) Filed: Apr. 30, 2008

(65) Prior Publication Data

US 2008/0197628 A1    Aug. 21, 2008

Related U.S. Application Data

(63) Continuation of application No. 11/593,904, filed on Nov. 7, 2006, now abandoned, which is a continuation of application No. 10/214,496, filed on Aug. 8, 2002, now Pat. No. 7,182,372.

(51) Int. Cl.
*F16L 17/00* (2006.01)
(52) U.S. Cl. ........................ 285/374; 285/345
(58) Field of Classification Search .............. 285/27, 285/24, 110, 230, 232, 231, 339, 344, 399, 285/345, 374; 277/604; 138/96 R
See application file for complete search history.

(56) References Cited

FOREIGN PATENT DOCUMENTS

| | | | | |
|---|---|---|---|---|
| DE | 3635100 A1 | * | 4/1988 | |
| DE | 3826622 A1 | * | 2/1990 | |
| DE | 4122455 A1 | * | 1/1993 | |
| GB | 2190717 A | * | 11/1987 | |
| GB | 2274888 A | * | 8/1994 | |
| JP | 52071727 A | * | 6/1977 | |
| JP | 04258591 A | * | 9/1992 | |

* cited by examiner

*Primary Examiner*—Aaron Dunwoody
(74) *Attorney, Agent, or Firm*—Parsons & Goltry; Robert A. Parsons; Michael W. Goltry

(57) ABSTRACT

An annular beveled insert for enhancing the insertion of a plain end of a pipe into a mating belled end of a pipe, the insert including an annular main body portion having a substantially flat surface and a beveled opposed surface. The annular main body portion has inner and outer diameters approximately equal to inner and outer diameters, respectively, of the plain end of the pipe. An outwardly directed flange extends from the annular main body portion around a periphery and has an outer diameter greater than the outer diameter of the plain end of the pipe. The flange is sufficiently flexible so that it bends into an angle of approximately ninety degrees with the flat surface of the annular main body portion and aids the main body portion in masking the plain end of the pipe as it passes through the annular gasket.

8 Claims, 2 Drawing Sheets

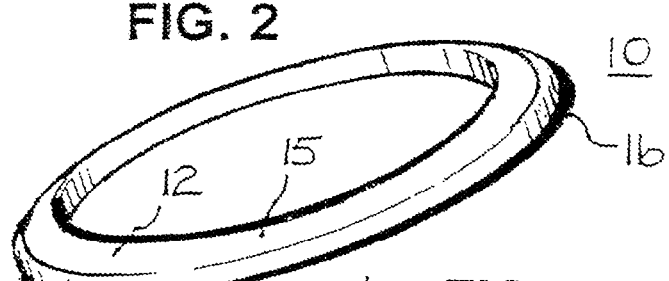
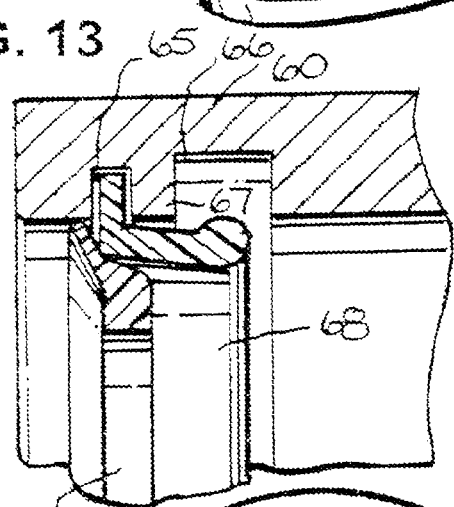
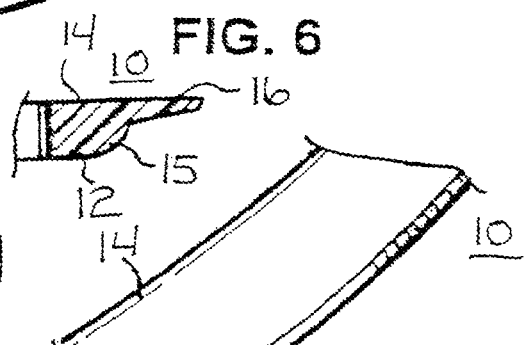
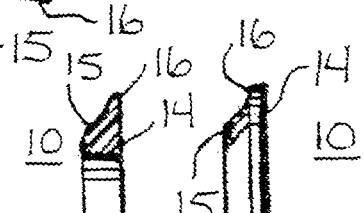
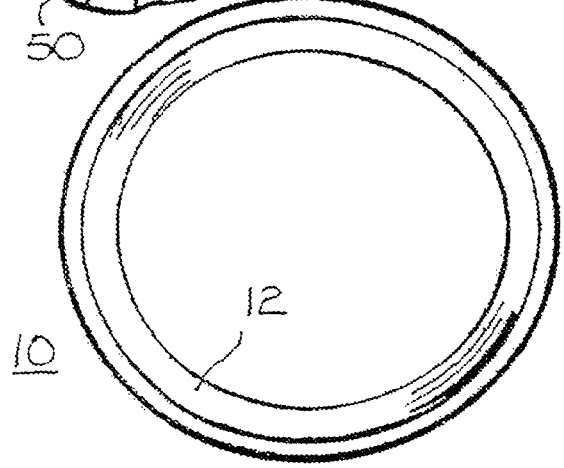

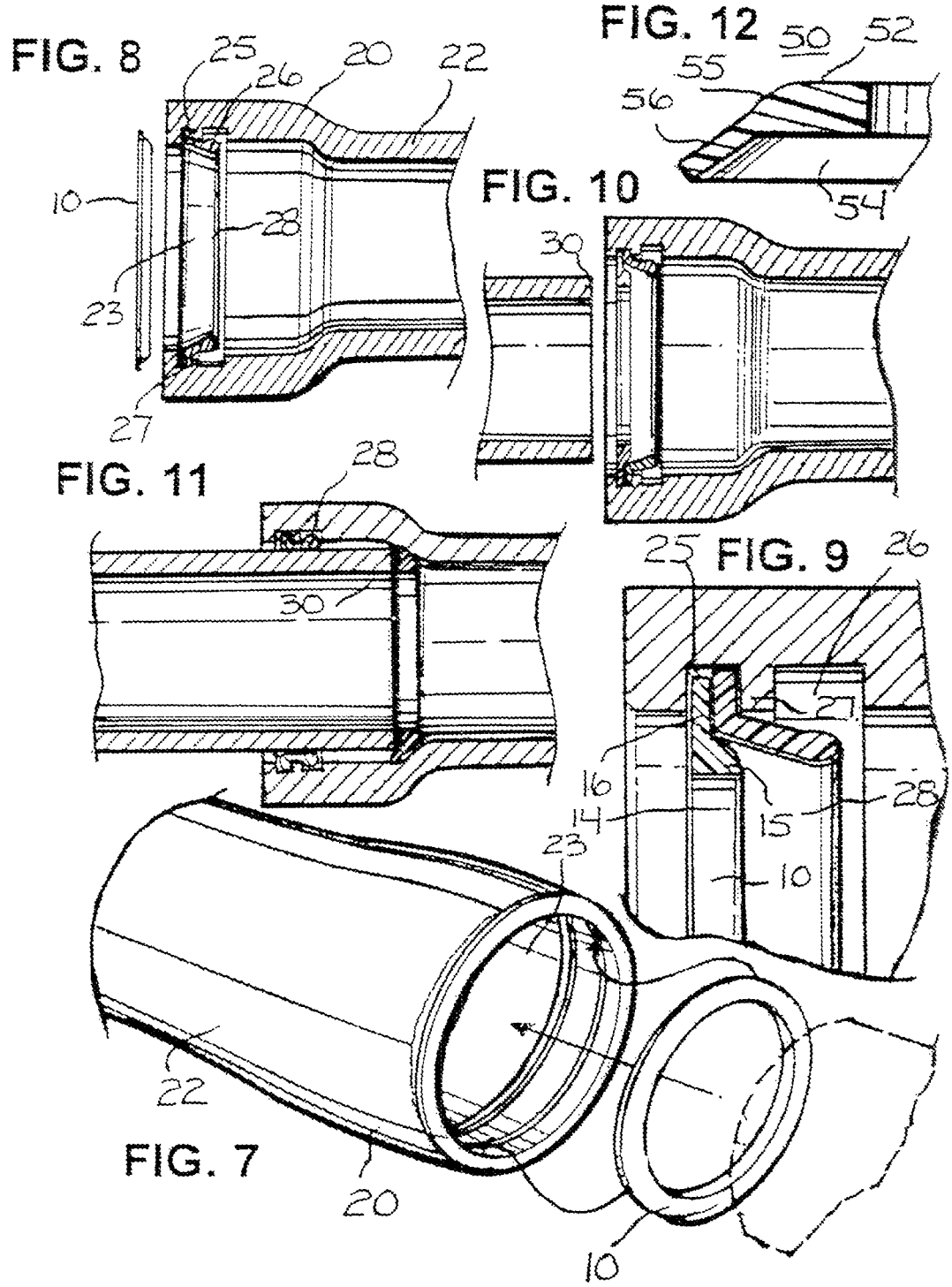

BEVELED INSERT FOR FACILITATING COUPLING PIPES

CROSS REFERENCE TO RELATED APPLICATIONS

This application is a continuation application of currently pending U.S. patent application Ser. No. 11/593,904, filed 07 Nov. 2006 now abandoned which was a continuation of U.S. patent application Ser. No. 10/214,496, filed 08 Aug. 2002 now U.S. Pat No. 7,182,372.

FIELD OF THE INVENTION

This invention relates to construction materials.

More particularly, the present invention relates to pipe couplings.

In a further and more specific aspect, the instant invention concerns devices for facilitating the coupling of pipes.

BACKGROUND OF THE INVENTION

Pipes have long been used for the delivery of various fluids, and the methods used for their installation are well-established. While the following invention can apply to many types of pipe for the delivery of many types of fluid, the following discussion will be focused upon liquid delivery, namely water pipes. Typically, water mains employ a type of pipe known as ductile iron. Lengths of pipe are coupled by inserting the end of one pipe into a belled end of an adjacent pipe. Using uncut lengths of pipe, this system works quite efficiently. However, problems develop when a length of pipe must be shortened by cutting. The cut end of the pipe has a relatively sharp edge which when inserted into the belled end of the adjacent pipe may damage the gasket located therein. This is typically referred to as "fish mouthing", and results in leakage at the joint.

Conventionally, this problem is overcome by cutting a bevel into the cut pipe end. This, however, creates more problems. Specifically, forming a bevel in ductile iron pipe is extremely difficult. Currently, the bevel is formed using the cut-off saw previously used to cut the pipe to the desired length. The saw used is cumbersome and heavy, has a blade turning at approximately 5600 rpms, and is therefore dangerous and imprecise. Furthermore, the blade manufacturers specifically prohibit this use of the blade, because the stresses are uneven and shattering of the blade tends to occur. As well as being dangerous, forming a bevel in this manner is expensive due to the time in labor and increased number of blades used.

Beveled attachments have been developed for aiding in the insertion of an end of a pipe segment through a gasket in a belled end of a pipe segment. While very effective, placing a beveled attachment on the end of a pipe segment and inserting the pipe can require some practice. When done properly, beveled attachments work extremely well, but, as with many things, improperly positioned attachments may work improperly.

It would be highly advantageous, therefore, to remedy the foregoing and other deficiencies inherent in the prior art.

Accordingly, it is an object of the present invention to provide a new and improved method and apparatus for facilitating the coupling of pipes.

Another object of the invention is to provide a beveled insert, which permits insertion of a pipe end without damaging a sealing gasket.

And another object of the invention is to provide a device in the belled end of a pipe segment already prepared for the insertion of a pipe end.

Yet another object of the present invention is to provide a beveled insert capable of electrically disconnecting pipe segments or if desired, electrical coupling pipe segments.

SUMMARY OF THE INVENTION

Briefly, to achieve the desired objects of the instant invention in accordance with a preferred embodiment thereof, provided is an annular beveled insert for enhancing the insertion of a plain end of a pipe into a mating belled end of a pipe. The insert includes an annular main body portion having a substantially flat surface and a beveled opposed surface. The annular main body portion has inner and outer diameters approximately equal to inner and outer diameters, respectively, of the plain end of the pipe. An outwardly directed flange extends from the annular main body portion around a periphery and has an outer diameter greater than the outer diameter of the plain end of the pipe. The flange engages an inner surface of the belled end to temporarily hold the beveled insert in place as the plain end is inserted into the belled end. The flange is sufficiently flexible so that it bends into an angle of approximately ninety degrees with the flat surface of the annular main body portion and aids the main body portion in masking the plain end of the pipe as it passes through the annular gasket.

The beveled insert is used in a method of joining pipe segments, which includes providing a first pipe segment having a belled end with an inner diameter and an annular gasket carried within the belled end. A second pipe segment is provided having an end with inner and outer diameters. An annular beveled insert is provided including an annular main body portion having a substantially flat surface and a beveled opposed surface, the annular main body portion having inner and outer diameters approximately equal to the inner and outer diameters, respectively, of the end of the second pipe segment. An outwardly directed flange extends from the annular main body portion around the periphery thereof with an outer diameter greater than the outer diameter of the plain end of the pipe. The annular beveled insert is positioned in the belled end of the first pipe segment in juxtaposition to the annular gasket. The end of the second pipe segment is inserted in the belled end of the first pipe segment so as to but the end of the first pipe segment against the flat surface of the annular main body portion. The end of the second pipe segment is moved axially in the belled end of the first pipe segment with the beveled insert engaging and masking the end of the second pipe segment as the end of the second pipe segment passes through the annular gasket and moves into a seated position.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 1 is a view in front elevation of a beveled insert according to the present invention;

FIG. 2 is a perspective view of the beveled insert of FIG. 1;

FIG. 3 is a view in side elevation of the beveled insert of FIG. 1;

FIG. 4 is a sectional view of the beveled insert, similar to FIG. 3;

FIG. 5 is an enlarged perspective view of the beveled insert of FIG. 1, portions thereof broken away and shown in section;

FIG. 6 is a sectional view of the broken away portion of the beveled insert;

FIG. 7 is a perspective view of the bell end of a pipe illustrating an initial step in an installation operation of the beveled insert;

FIG. 8 is a sectional view of the bell end of the pipe illustrating the inner gasket and the relative positioning of the beveled insert;

FIG. 9 is an enlarged sectional view of the bell end of the pipe with the beveled insert properly inserted, portions thereof broken away;

FIG. 10 is a sectional view of the bell end of the pipe with the beveled insert properly inserted and a plain end of a mating pipe in a pre-insert position;

FIG. 11 is a sectional view of the bell end of the pipe with the plain end of the mating pipe fully inserted and the beveled insert moved to the inserted position;

FIG. 12 is a sectional view of a modified beveled insert, in accordance with the present invention; and FIG. 13 is a sectional view of a bell end of a pipe with the beveled insert of FIG. 12 properly inserted.

DETAILED DESCRIPTION OF THE PREFERRED EMBODIMENTS

Typically, water mains employ a type of pipe known as ductile iron. Lengths of pipe are coupled by inserting the end of one pipe into a belled end of an adjacent pipe. Many times during this procedure, a pipe segment having a belled end receives a cut end of a pipe segment. The belled end is of conventional manufacture and includes an annular gasket carried therein. It should be pointed out that the term "belled" is used here to describe any pipe end that acts as a female fitting and is configured to receive another pipe end, and is intended to include pipes having at least a portion with a larger diameter than the inserted pipe. When a non-uniform length of pipe is required, a portion of a pipe segment must be removed by cutting, resulting in the cut end. Conventionally, when inserting the cut end into the belled end, damage will occur to the annular gasket. To prevent damage to the annular gasket by the cut end, often referred to as "fish mouthing", a beveled attachment may be carried by the cut end. By masking the sharp edges of the cut end with the beveled attachment, the pipe can be inserted into the belled end through the annular gasket without any damage occurring thereto.

Turning now to the drawings in which like reference characters indicate corresponding elements throughout the several views, attention is first directed to FIGS. 1 through 6, which illustrate a beveled insert, generally designated 10, in accordance with the present invention. As will be appreciated by those skilled in the art, beveled insert 10 is intended to facilitate the insertion of a pipe end into a receiving pipe end or pipe fitting. It will be understood by those skilled in the art that beveled insert 10 can be used to couple a pipe to another pipe or to a pipe fitting. The term "pipe" as used in the following description and claims is intended to include both a pipe and a pipe fitting. Thus, the pipe may be constructed of virtually any material, and may be employed to carry substantially any material. For the purposes of the present description however, the pipe to be joined is preferably of the type referred to as ductile iron, and used primarily for water mains. It will also be understood that the present invention may be employed with substantially any diameter pipe.

Beveled insert 10 is substantially annular in shape and includes a main body portion 12 with a flat rear surface 14 and a rounded or beveled front surface 15. Further, a flange 16, integrally formed with main body portion 12, extends radially outwardly around the periphery of main body portion 12. In this embodiment, beveled insert 10 is preferably constructed of plastic materials such as high density polyethylene, PVC, or the like, molded in an integral piece. However, as will be understood by those skilled in the art, other materials such as metal, resins, composites, etc. may be employed. Further, it will be understood from the description below that at least flange 16 is flexible or bendable.

Main body portion 12 of annular insert 10 has an inner diameter approximately equal to the inner diameter of the cut end of a pipe segment and an outer diameter substantially equal to the outer diameter of the cut end of the pipe segment. Rear surface 14 of main body portion 12 is flat to substantially mate with the flat cut end of the pipe segment, as will be described in detail below. Further, beveled front surface 15 includes a slope that may be of any pitch so as to efficiently pass the annular gasket in belled end. It will also be understood that beveled front surface 15 can be a rounded chamfer or other configuration. Throughout this disclosure the term "beveled" is used as a generic term to denote curved surface 15.

Turning now to FIGS. 7 and 8, an initial step in an installation process is illustrated. For convenience in understanding, a pipe 22 with a belled end 20 of conventional manufacture is illustrated and described. Belled end 20 of pipe 22 defines an opening 23. Belled end 20 of pipe 22 is constructed with a pair of grooves 25 and 26 formed in the inner periphery and extending completely around the circumference. Groove 25 is formed adjacent opening 23 and groove 26 is formed adjacent groove 25 so as to define a small land or ridge 27 therebetween (best seen in FIG. 9). An annular gasket 28 is initially installed with an outwardly extending flange positioned in groove 25 and the remainder extending into opening 23. As explained above, the purpose of annular gasket 28 is to provide a seal between the inner surface of belled end 20 and the outer surface of a mating pipe end.

In an initial step in the installation of beveled insert 10, beveled front surface 15 is positioned to face opening 23 of belled end 20 with flat rear surface 14 facing away from opening 23. Beveled insert 10 is then moved into opening 23 until flange 16 is positioned in groove 25 and main body portion 12 extends into opening 23 in front of annular gasket 28, as illustrated in FIG. 9. Flange 16 of beveled insert 10 is specifically designed with a width that allows it to be easily positioned in groove 25 along with the flange of annular gasket 28. Further, the outer diameter of flange 16 is only slightly smaller then the diameter of groove 25 so that flange 16 extends well into groove 25. Here it will be understood by those skilled in the art that groove 25 of conventional manufactured belled ends is generally wide enough to receive the flange of annular gasket 28 and flange 16 of beveled insert 10 without requiring any additional removal of material or other work. Thus, beveled insert 10 is held in opening 23 by flange 16 with flat rear surface 14 facing outwardly in opening 23 and beveled front surface 15 adjacent annular gasket 28.

Referring additionally to FIG. 10, to insert a cut end 30 of a pipe segment into belled end 20, cut end 30 is axially aligned with belled end 20. While cut end 30 is used in the description, it will be understood that the term "cut end" can include cut ends, broken ends, and manufactured ends, that are to be received by belled end 20. Cut end 30 is moved axially into belled end 20 so that the end surface first engages flat rear surface 14 of beveled insert 10. The installer continues to move cut end 30 axially into belled end 20, causing flange 16 to pull out of groove 25 and wrap around the outer edge with beveled front surface 15 simultaneously pushing against annular gasket 28. Thus, beveled insert 10 completely covers cut end 30, allowing it to slide smoothly past annular gasket 28 and to properly seat in belled end 20, as illustrated in FIG. 11. In this manner the sharp edges of cut end 30 are masked during insertion of the pipe segment into belled end 20 of pipe segment 22. Thus, annular gasket 28 remains undamaged and will effectively engage and seal to the pipe segment as beveled insert 10 passes completely through annular gasket 28. It should be noted that beveled insert 10 passes completely through gasket 28 during insertion as can be seen with reference to FIG. 11. Once cut end 30 is completely installed (i.e., the pipe has been pushed into its home position), beveled insert 10 remains in place over cut end 30.

Turning now to FIG. 12, a different embodiment of a beveled insert, generally designated 50, is illustrated. Beveled insert 50 is substantially annular in shape and includes a main body portion 52 with a flat rear surface 54 and a rounded or beveled front surface 55. Further, a flange 56, integrally formed with main body portion 52, extends outwardly around the periphery of main body portion 52. In this embodiment, flange 56 extends at an angle to main body portion 52 so that the rear surface of flange 56 and flat rear surface 54 of body portion 52 define an angle less than ninety degrees. Also, in this embodiment the outer diameter of flange 56 is approximately equal to (or even slightly greater than) the inner diameter of a belled end of a pipe.

Referring additionally to FIG. 13, a belled end 60 of a pipe is illustrated with a pair of grooves 65 and 66 formed to define a land or ridge 67 therebetween, generally as described above. The difference here is that groove 55 is nearly filled with the flange of an annular gasket 68. Here it will be understood by those skilled in the art that groove 55 of this conventional manufactured belled end is generally not wide enough to receive the flange of annular gasket 68 and flange 56 of beveled insert 50. In this embodiment, beveled insert 50 is pushed into the opening of belled end 60 until it is in juxtaposition to annular gasket 68. The outer end of flange 56 frictionally engages the inner surface of belled end 60 to hold beveled insert 50 fixedly in place until the insertion of a cut end can be accomplished. It will be understood that insert 10 can also be employed in this instance, as flange 16 will simply move into the shape of insert 50, and engage the inner surface of belled end 20 or the corner of groove 65.

Clearly, the flange of the beveled insert can be formed at any angle, relative to the main body, (generally from a radially outwardly extending position to less than ninety degrees) so as to hold and properly position the beveled insert in the belled end prior to insertion of the cut end and to mask the sharp edges of the cut end during insertion of the cut end. Also, the beveled front surface of the main body can be formed in any desired shape to enhance passage of the beveled insert and the masked sharp edges of the cut end passed the annular gasket in the belled end.

When the cut end of a pipe (not shown) is inserted into belled end 60, it first engages flat rear surface 54 of main body portion 52. Because flange 56 is initially angled with respect to flat rear surface 54, it easily wraps around the outer edge of the cut end with beveled front surface 55 simultaneously pushing against annular gasket 68. Thus, beveled insert 50 completely covers the cut end, allowing it to slide smoothly past annular gasket 68 and to properly seat in belled end 60. In this manner the sharp edges of the cut end are masked during insertion of the pipe segment into belled end 60. Thus, annular gasket 68 remains undamaged and will effectively engage and seal to the pipe segment as beveled insert 50 passes completely through annular gasket 68. It should be noted that beveled insert 50 passes completely through annular gasket 68 during insertion.

As an additional consideration, inserts 10 and 50 can be fabricated of a non-conductive (insulating) material. Pipe segments joined in this manner will be electrically disconnected, reducing or eliminating conductivity between segments and thereby inhibiting stray current corrosion. Alternatively, conductive threads or contacts can be added to inserts 10 and 50 to promote conductivity between pipe segments. Continuous conduction along a pipe line can be useful in certain applications, such as systems which utilize cathodic corrosion protection. As an example of conductive contacts, attention is directed to FIG. 5, which illustrates in broken line a possible contact 70 which can be added to insert 10. Contact 70 can be a biased pin or spring formed of a conductive material. When cut end 30 engages insert 10, it will electrically communicate with contact 70. When fully positioned, contact 70 is compressed between cut end 30 and the inner surface of pipe 22. By employing a biased pin or compression spring, full contact will be maintained, providing continuous conduction between segments.

Thus, a new and improved method and apparatus for facilitating the coupling of pipes is disclosed. Basically, a new and improved beveled insert is disclosed, which permits insertion of a pipe end without damaging a sealing gasket. The new and improved beveled insert is substantially easier to position in the belled end of a pipe and substantially relaxes manufacturing and assembling tolerances so that the new and improved beveled insert can be substantially less expensive to manufacture and is much simpler to use.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. An annular beveled insert and pipe structure comprising;
   a first pipe having a plain end;
   a second pipe having a belled end, the belled end is expanded radially outwardly to terminate in an opening;
   the plain end of the first pipe received within the belled end of the second pipe;
   an annular main body portion having a substantially flat surface and a beveled opposed surface, the annular main body portion having inner and outer diameters approximately equal to inner and outer diameters, respectively, of the plain end of the first pipe, and the substantially flat surface received by an edge of the plain end in abutting relationship, with the beveled opposed surface directed perpendicularly away from the edge;
   a contact of electrically conductive material carried by the annular main body portion and extending through the main body portion from the substantial flat surface to the beveled opposed surface; and
   wherein the annular main body portion is captured between the edge of the plain end of the first pipe and a base of the belled end of the second pipe, the contact touching and extending between the edge of the plain end of the first pipe and the base of the belled end of the second pipe, electrically connecting the first pipe with the second pipe.

2. An annular beveled insert and pipe structure as claimed in claim 1 further including an outwardly directed flange extending from the annular main body portion around a periphery, the flange having an outer diameter greater than the outer diameter of the plain end of the first pipe and greater than an inner diameter of the belled end of the second pipe, wherein the flange forms an angle with the substantially flat surface of the annular main body portion.

3. An annular beveled insert and pipe structure as claimed in claim 2 wherein the flange and the annular main body portion are integrally formed.

4. An annular beveled insert and pipe structure as claimed in claim 2 wherein at least the flange is flexible so that the flange is bendable into an angle of approximately ninety degrees with the flat surface of the annular main body portion.

5. An annular beveled insert and pipe structure comprising;
   a first ductile iron pipe having a plain end;
   a second ductile iron pipe having a belled end, the belled end is expanded radially outwardly to terminate in an opening;
   the plain end of the first ductile iron pipe received within the belled end of the second ductile iron pipe;
   an annular main body portion having a substantially flat surface and a beveled opposed surface, the annular main body portion having inner and outer diameters approximately equal to inner and outer diameters, respectively, of the plain end of the first ductile iron pipe, and the substantially flat surface received by an edge of the plain end in abutting relationship, with the beveled opposed surface directed perpendicularly away from the edge;
   a contact of electrically conductive material carried by the annular main body portion and extending through the main body portion from the substantial flat surface to the beveled opposed surface; and
   wherein the annular main body portion is captured between the edge of the plain end of the first ductile iron pipe and a base of the belled end of the second ductile iron pipe, the contact touching and extending between the edge of the plain end of the first ductile iron pipe and the base of the belled end of the second ductile iron pipe, electrically connecting the first ductile iron pipe with the second ductile iron pipe.

6. An annular beveled insert and pipe structure as claimed in claim 5 further comprising an outwardly directed flange extending from the annular main body portion around a periphery, the flange having an outer diameter greater than the outer diameter of the plain end of the first ductile iron pipe and greater than an inner diameter of the belled end of the second ductile iron pipe, wherein the flange forms an angle with the substantially flat surface of the annular main body portion.

7. An annular beveled insert and pipe structure as claimed in claim 6 wherein the flange and the annular main body portion are integrally formed.

8. An annular beveled insert and pipe structure as claimed in claim 6 wherein at least the flange is flexible so that the flange is bendable into an angle of approximately ninety degrees with the flat surface of the annular main body portion.

* * * * *